(12) United States Patent
Michaelis

(10) Patent No.: US 6,668,042 B2
(45) Date of Patent: Dec. 23, 2003

(54) TELEPHONE HANDSET FOR MIXED-MODE VOICE-AND-TDD COMMUNICATION

(75) Inventor: Paul Roller Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 485 days.

(21) Appl. No.: 09/769,222

(22) Filed: Jan. 24, 2001

(65) Prior Publication Data

US 2002/0097866 A1 Jul. 25, 2002

(51) Int. Cl.[7] .......................... H04M 11/00; H04M 1/00
(52) U.S. Cl. .......................................... 379/52; 379/443
(58) Field of Search .......................... 379/52, 443, 444, 379/428.01, 428.02, 93.37, 90.01

(56) References Cited

U.S. PATENT DOCUMENTS

| 1,100,480 A | * | 6/1914 | Haralson et al. ............... 362/24 |
| 3,072,755 A | * | 1/1963 | Kuhberg ..................... 379/430 |
| 3,585,302 A | * | 6/1971 | Swan, Jr. .................... 379/443 |
| 4,268,721 A | * | 5/1981 | Nielson et al. ................ 379/52 |
| 4,799,254 A | * | 1/1989 | Dayton et al. ............. 379/93.26 |
| 5,291,541 A | * | 3/1994 | Gibler et al. .................. 379/52 |
| 5,588,041 A | * | 12/1996 | Meyer, Jr. et al. ......... 455/569.2 |
| 5,590,417 A | * | 12/1996 | Rydbeck .................. 455/575.2 |
| 5,841,858 A | * | 11/1998 | Frierson ..................... 379/430 |

FOREIGN PATENT DOCUMENTS

EP          0 251 296         1/1988        .......... H04M/11/06

* cited by examiner

*Primary Examiner*—Jack Chiang
*Assistant Examiner*—Lisa Hashem
(74) *Attorney, Agent, or Firm*—David Volejnicek

(57) ABSTRACT

A modular telephone handset (100) comprises an earpiece (102), a mouthpiece (104), and a handle (106) detachably attached at one end to the earpiece and at the other end to the mouthpiece. Attachment and detachment is effected by snap or twist joints (108,110). This allows one of the earpiece and the mouthpiece when detached to be used by a human user for listening or talking on a telephone call while simultaneously allowing the other of the earpiece and the mouthpiece to be used for receiving or transmitting data with an acoustic coupler (202) of a TDD device (200), thereby facilitating mixed-mode TDD-and-voice communication at any telephone that is equipped with the modular handset.

16 Claims, 2 Drawing Sheets

TELEPHONE HANDSET FOR MIXED-MODE VOICE-AND-TDD COMMUNICATION

TECHNICAL FIELD

This invention relates generally to telecommunication devices for the deaf.

BACKGROUND OF THE INVENTION

Hearing-impaired people communicate over telephone lines by using telecommunication devices for the deaf (TDDs), also known as teletypewriters (TTYs). TDDs resemble portable laptop computers, except that their displays are typically limited to one or two lines of alphanumeric text. TDDs communicate on telephone lines via a standard Baudot communications protocol (asynchronous, no carrier, half-duplex, frequency-shift-keying, 45.45 baud).

Until approximately a decade ago, most TDDs came equipped with acoustic couplers, resembling suction cups, into which the handsets of standard telephones are placed and the TDDs communicate through the handsets' microphone and speaker. Nowadays, the majority of TDDs plug directly into wall telephone jacks, and interestingly only the more expensive models also come equipped with acoustic couplers that allow them to be used in conjunction with telephone handsets.

Some users of TDDs wish to use mixed-mode TDD-and-voice communication. That is, they wish to use the TDD to communicate in one direction and to use voice to communicate in the other direction. For example, a person who is hard of hearing but still able to speak clearly may wish to receive via TDD and reply by voice. Conversely, a person who hears well but has trouble speaking may wish to receive voice from the other party and reply via TDD. People who wish to communicate in this mixed-mode fashion, as well as the people on the other end of these calls, must use TDDs that are equipped with acoustic couplers, and must continuously pop the telephone handset into and out of the TDD's acoustic coupler in order to switch back-and-forth between TDD and voice communication. This is very awkward and disruptive.

SUMMARY OF THE INVENTION

This invention is directed to solving these problems and disadvantages of the prior art. According to one aspect of the invention, a telephone handset comprises an earpiece and a mouthpiece detachably attached to each other, thus allowing one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler—the acoustic coupler of a TDD, for example. According to another aspect of the invention, a telephone handset comprises an earpiece, a mouthpiece, and a handle detachably attached at one end to the earpiece and at the other end to the mouthpiece, thus allowing one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler.

A telephone handset according to the invention permits convenient use of the handset in both a standard mode of operation and in a hybrid TDD-and-voice mode of operation. The invention thus permits any user voice terminal that is equipped with the handset to be used as a mixed-mode terminal. When the detached earpiece is mounted to a head-clip, it further facilitates hands-free use of the handset in a receive-voice/transmit-TDD mode of operation that frees both of the user's hands for typing on the TDD. When the earpiece is equipped with a device that automatically mutes the sidetone path when transmitting via TDD, the user will not hear the Baudot tones emitted by his or her TDD when typing.

These and other features and advantages of the invention will become more evident from the following detailed description of an illustrative embodiment of the invention considered together with the drawing.

DETAILED DESCRIPTION

Figure 2:
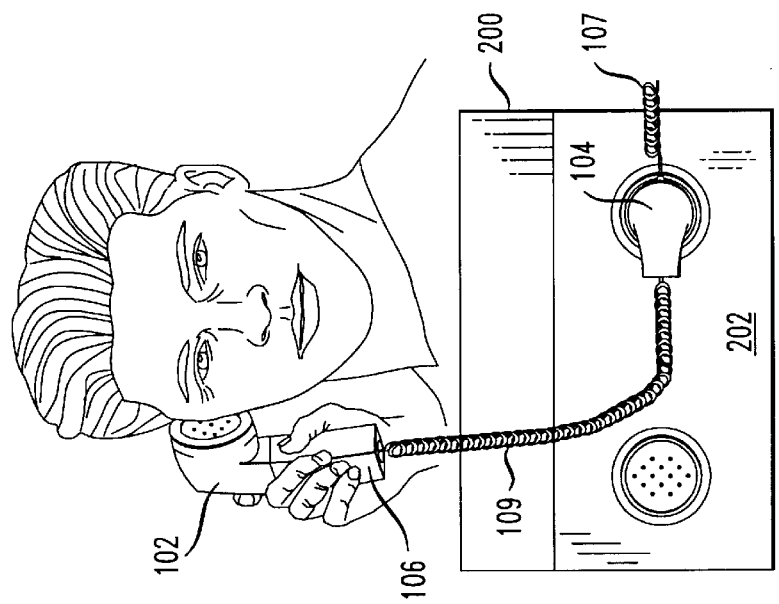
FIG. 2 is a view of the handset of FIG. 1 as used in a first embodiment of a hybrid transmit-TDD/receive-voice environment.
Figure 1:
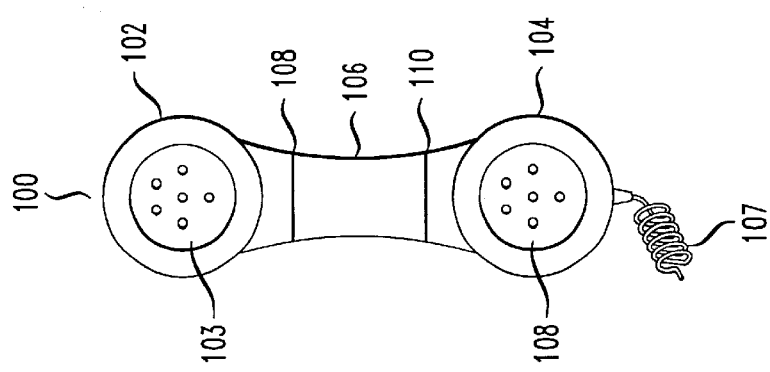
FIG. 1 is a front view of a telephone handset that includes an illustrative embodiment of the invention.
Figure 4:
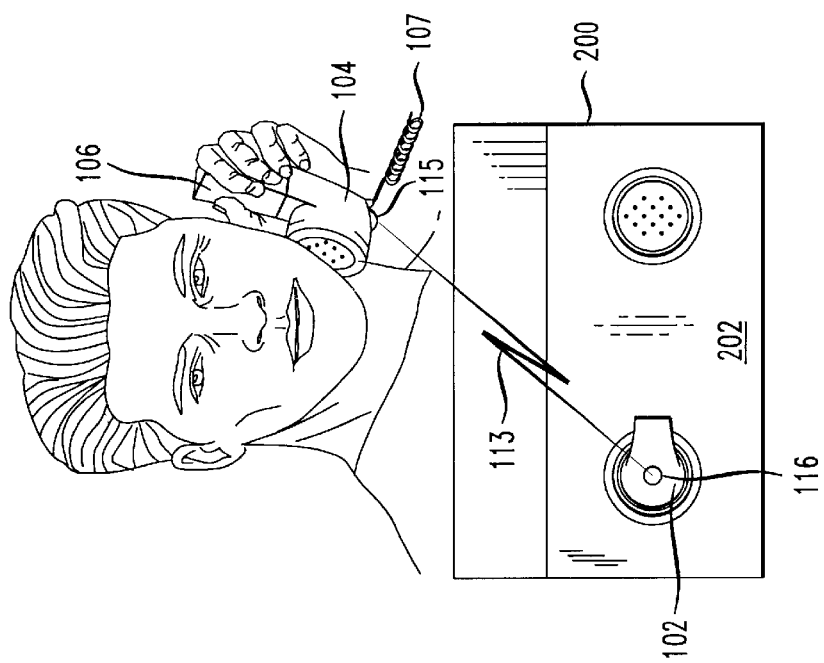
FIG. 4 is a view of the handset of FIG. 1 as used in a hybrid transmit-voice/receive-TDD environment.
Figure 3:
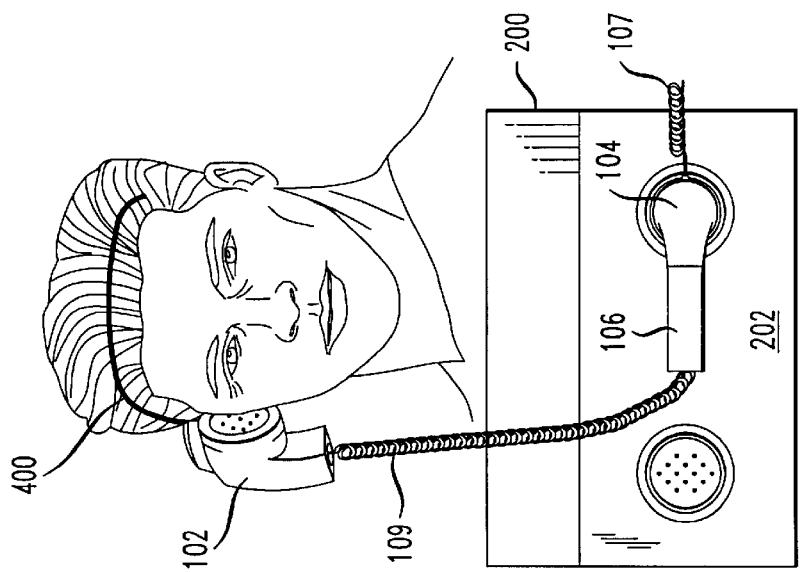
FIG. 3 is a view of the handset of FIG. 1 as used in a second embodiment of a hybrid transmit-TDD/receive-voice environment.

FIG. 1 shows a telephone handset 100 that includes an illustrative embodiment of the invention. Handset 100 conventionally includes an earpiece 102 including a speaker 103, a mouthpiece 104 including a microphone 105 and a handset cord 107, and a handle 106 between earpiece 102 and mouthpiece 104. Conventionally, elements 102–106 form a unitary hollow body. According to the invention, however, elements 102–106 are discrete elements that are detachably attached together at joints 108 and 110. Alternatively, handle 106 and mouthpiece 104 may be fixedly joined together, so that joint 110 does not exist. Joints 108 and 110 are illustratively conventional snap joints or twist (e.g., bayonet) joints. When attached together, elements 102–106 form a telephone handset 100 that can be used in the conventional manner. However, when detached at joint 108 or 110, elements 102–106 may be easily used for mixed-mode TDD-and-voice communication where one element 102 or 104 is used as a handset while the other element 102 or 104 is used with an acoustic coupler 202 of a TDD 200, as shown in FIGS. 2–4. To permit mouthpiece 102 and earpiece 104 to be separated from each other by an adequate distance, speaker 103 is connected to handset cord 107 either by a long cord 109, as shown in FIGS. 2 and 3, that extends through handle 106 and is stored inside handle 106 when elements 102–106 are attached together, or by a wireless link 113, as shown in FIG. 4, whose transmitter 115 is mounted in mouthpiece 104 and whose receiver 116 is mounted in earpiece 102.

A user who wishes to transmit via TDD 200 and to receive voice places mouthpiece 104 in acoustic coupler 202 of TDD 200 and places earpiece 102 by his or her ear, as shown in FIGS. 2 and 3. With handle 106 attached to earpiece 102, the user may hold earpiece 102 by his or her ear by hand, as shown in FIG. 2. However, this may prove awkward, since the user needs his or her hands to type transmissions on TDD 200. Therefore, a preferred arrangement is the one shown in FIG. 3, where the user uses a head-mount 400 to effectively form a headphone with earpiece 102 and thus hold earpiece 102 by his or her ear in a hands-free configuration. In this configuration, handle 106 is neither required nor desired on earpiece 102, and therefore joint 110 may be eliminated.

A user who wishes to transmit by speaking and to receive via TDD 200 places earpiece 102 in acoustic coupler 202 of TDD 200 and holds mouthpiece 104 by his or her mouth via handle 106, as shown in FIG. 4.

Of course, various changes and modifications to the illustrative embodiment described above will be apparent to those skilled in the art. For example, the earpiece may include a device at the input to the speaker that automatically mutes the sidetone path when the TDD is transmitting through the mouthpiece, so that users will not hear the Baudot tones that are emitted by their TDDs while they are typing. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A telephone handset comprising:

an earpiece; and a mouthpiece detachably attached to the earpiece, allowing one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler.

2. The telephone handset of claim 1 for use with the acoustic coupler of a telecommunication device for the deaf (TDD).

3. The telephone handset of claim 1 wherein:

the earpiece and the mouthpiece are detachably attached by one of a twist joint and a snap joint.

4. The telephone handset of claim 1 wherein:

the mouthpiece includes a connector for connecting to a handset cord; and the earpiece includes a speaker and a cord extending through the earpiece and the mouthpiece and connecting the speaker to the connector, the cord being long enough to allow one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler, the cord being stored inside the earpiece and the mouthpiece when the earpiece and the mouthpiece are attached and form the telephone handset.

5. The telephone handset of claim 1 wherein:

the mouthpiece includes means for connecting to a telephone set; and the earpiece includes a speaker and a wireless link connecting the speaker to one of the means and the telephone set.

6. The telephone handset of claim 1 wherein:

the mouthpiece includes a microphone; and the earpiece includes a speaker and means connected to the speaker for preventing output of the microphone from reaching the speaker.

7. The telephone handset of claim 1 wherein:

the mouthpiece includes a handle extending from the mouthpiece and detachably attached at a far end from the mouthpiece to the earpiece.

8. The telephone handset of claim 7 wherein:

the mouthpiece includes a connector for connecting to a handset cord; and the earpiece includes a speaker and a cord extending through the earpiece and the mouthpiece including through the handle to the connector, the cord being long enough to allow one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler, the cord being stored inside the handle when the earpiece and the mouthpiece are attached and form the telephone handset.

9. The telephone handset of claim 1 wherein:

the earpiece includes means for mounting the earpiece to a head-mount.

10. A telephone handset comprising:

an earpiece;

a mouthpiece;

a handle detachably attached at one end to the earpiece and detachably attached at an opposite end to the mouthpiece, allowing one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler.

11. The telephone handset of claim 10 for use with the acoustic coupler of a telecommunication device for the deaf (TDD).

12. The telephone handset of claim 10 wherein:

the earpiece and the handle are detachably attached by one of a twist joint and a snap joint; and the handle and the mouthpiece also are detachably attached by one of a twist joint and a snap joint.

13. The telephone handset of claim 10 wherein:

the mouthpiece includes a connector for connecting to a handset cord; and the earpiece includes a speaker and a cord extending through the earpiece, the handle, and the mouthpiece and connecting the speaker to the connector, the cord being long enough to allow one of the earpiece and the mouthpiece when detached to be used by a human user for listening or talking, respectively, on a telephone call while simultaneously allowing the other of the earpiece and the mouthpiece to be used for receiving or transmitting, respectively, data with an acoustic coupler, the cord being stored inside the handle when the mouthpiece, the handle, and the earpiece are attached together and form the telephone handset.

14. The telephone handset of claim 10 wherein:

the mouthpiece includes means for connecting to a telephone set; and the earpiece includes a speaker and a wireless link connecting the speaker to one of the means and the telephone set.

15. The telephone handset of claim 10 wherein:

the mouthpiece includes a microphone; and the earpiece includes a speaker and means connected to the speaker for preventing output of the microphone from reaching the speaker.

16. The telephone handset of claim 10 wherein:

the earpiece includes means for mounting the earpiece to a head-mount.

* * * * *